US009405860B1

(12) United States Patent
Trout

(10) Patent No.: US 9,405,860 B1
(45) Date of Patent: Aug. 2, 2016

(54) CONTENT ADDRESSABLE MEMORY IN WHICH KEYS ARE EMBEDDED IN COMPARATORS

(71) Applicant: L-3 Communications Corp., New York, NY (US)

(72) Inventor: Larry R. Trout, Taylorsville, UT (US)

(73) Assignee: L-3 Communications Corp., New York, NY (US)

( * ) Notice: Subject to any disclaimer, the term of this patent is extended or adjusted under 35 U.S.C. 154(b) by 304 days.

(21) Appl. No.: 14/204,684

(22) Filed: Mar. 11, 2014

(51) Int. Cl.
*G06F 17/30* (2006.01)

(52) U.S. Cl.
CPC ................................ *G06F 17/30982* (2013.01)

(58) Field of Classification Search
CPC ................................................. G06F 17/30982
See application file for complete search history.

(56) References Cited

U.S. PATENT DOCUMENTS

| 5,841,874 | A | 11/1998 | Kempke et al. | |
|---|---|---|---|---|
| 2006/0107153 | A1 | 5/2006 | Pham | |
| 2007/0113158 | A1* | 5/2007 | Fischer | G11C 15/00 714/777 |
| 2009/0070525 | A1 | 3/2009 | Dosaka et al. | |
| 2013/0135914 | A1 | 5/2013 | Kohli | |

OTHER PUBLICATIONS

Arsovski et al., "A Ternary Content-Addressable Memory (TCAM) Based on 4T Static Storage and Including a Current-Race Sensing Scheme," IEEE Journal of Sold State Circuits, vol. 38, No. 1 (Jan. 2003), pp. 155-158.
Pagiamtzis et al., "Content-Addressable Memory (CAM) Circuits and Architectures: A Tutorial and Survey," IEEE Journal of Solid-State Circuits, vol. 41, No. 3 (Mar. 2006), pp. 712-727.
Tabatabaee, "Content Addressable Memories" ENTS689L: Processing and Switching Commercial Network Processor Architectures, University of Maryland (Fall 2007), 29 pages.

\* cited by examiner

*Primary Examiner* — Eric S Cardwell
(74) *Attorney, Agent, or Firm* — Brian Tucker; Kirton | McConkie

(57) ABSTRACT

A content addressable memory (CAM) system can include a comparator core in which all of the keys of the CAM are embedded in comparator blocks. A search key can be provided to each of the comparator blocks, which can compare the search key to its embedded key and determine whether the search key matches the embedded key. The comparator blocks can be organized into paged sets in the comparator core such that only one of the comparator blocks in each paged set is selected and compares its embedded key to the search key at any given time. The comparator block selected in each paged set can be incremented until the search key has been compared to the keys embedded in all of the comparator blocks of the comparator core.

24 Claims, 10 Drawing Sheets

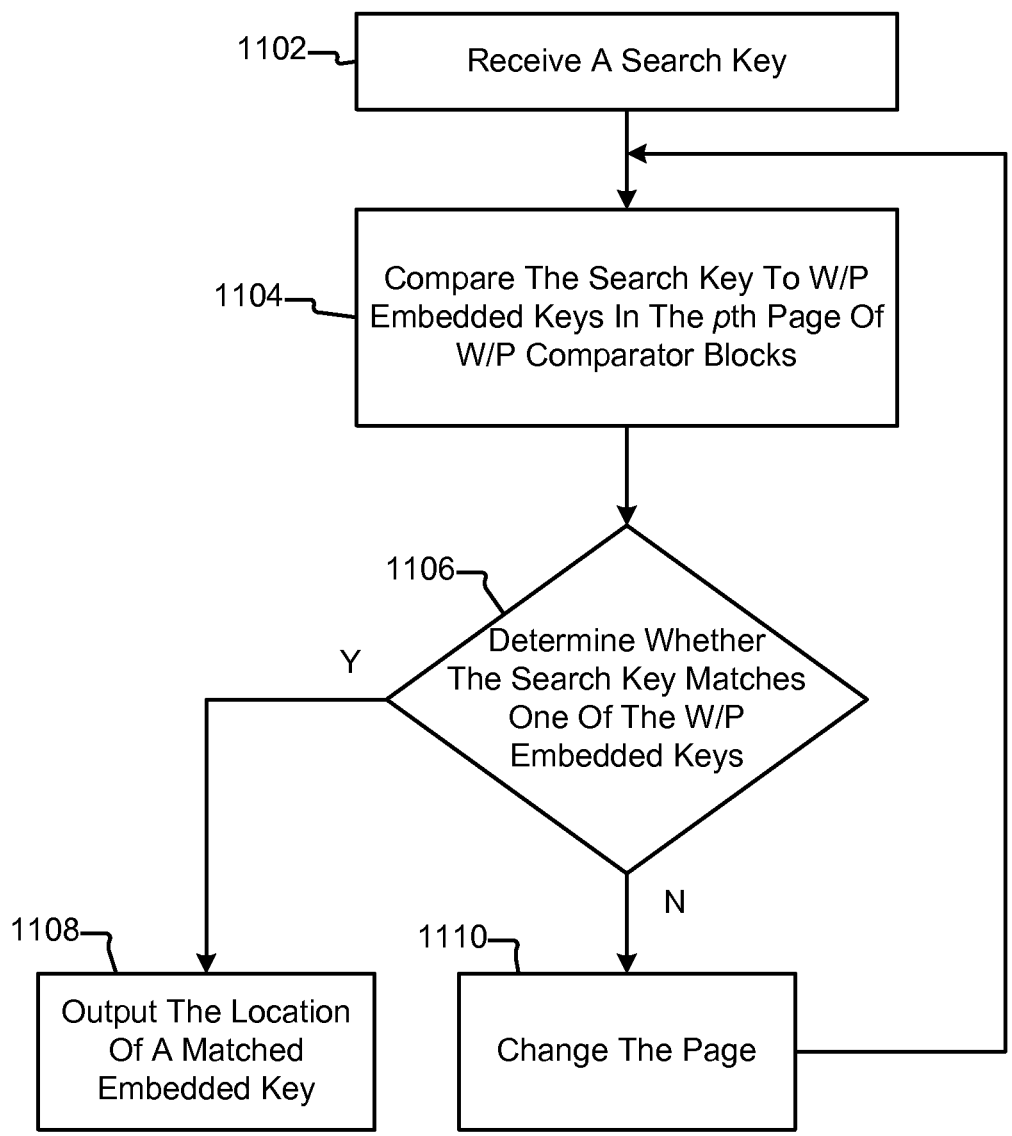

CONTENT ADDRESSABLE MEMORY IN WHICH KEYS ARE EMBEDDED IN COMPARATORS

BACKGROUND

A content addressable memory (CAM) stores a plurality of keys, and when presented with a search key, outputs the location in the CAM of a stored key that matches the search key. Although CAMs have many applications, one such application is routing in a computer or communications network. FIG. 1 illustrates an example of a prior art CAM.

The CAM 100 of FIG. 1 includes a word memory 102, comparators 152, and a location decoder 172. W N-bit keys are stored in the memory 102, where W and N are integers. The memory 102 can also store an N-bit mask for each stored key. Such a mask can identify some bits of the corresponding stored key as "do not care" bits, meaning that those bits are to be deemed to match a corresponding bit of an inputted search key 116 regardless of the value of the corresponding search key bit. Each comparator 152 comprises a key bit input 122 and a search key bit input 142 and possibly also a mask bit input 132. The location decoder 172 is connected to outputs 162 of the comparators 152.

The CAM 100 identifies a location in the memory 102 of a stored key that matches an inputted search key 116 as follows. An address incrementor 176 provides an address 104 of a first location in the memory 102, which causes the memory 102 to output the N-bit key 106 stored at the first location in the memory 102. The memory 102 can also output an N-bit mask 108 associated with the key 106.

Corresponding individual bits of the outputted key 106, the outputted mask 108, and the search key 116 can be provided to each of the comparators 152. That is, the first bits of the outputted key 106, the outputted mask 108, and the search key 116 can be provided to the first comparator 152. If the first bit of the outputted mask 108 is active or if the first bits of the outputted key 106 and the search key 116 have the same value, the first comparator 152 indicates a match on its output 162. Similarly, the second through the $N^{th}$ bits of the outputted key 106, the outputted mask 108, and the search key 116 are provided to the second through the $N^{th}$ comparators 152 each of which provides an output 162 indicating whether the corresponding bit is masked by the outputted mask 108 or there is a match between the corresponding bits of the outputted key 106 and the search key 116. The location decoder 172 determines whether the outputs 162 from the comparators 152 indicate that the search key 116 matches the outputted key 106 subject to the outputted mask 108. If so, the location decoder 172 identifies at its output 174 the address 104 as the location of a key in the memory 102 that matches the search key 116.

Otherwise, the address incrementor 176 increments the address 104, causing the memory 102 to output 106 the key stored at the next address in the memory 102 and output 108 any associated mask. The comparators 152 and location decoder 172 then determine whether the new outputted key 106 from the next address 104 in the memory 102 matches the search key 116. The foregoing is repeated (the address incrementor 176 increments the address 104 and the comparators 152 and location decoder 172 determine whether the key 106 output from the new address 104 in the memory 102 matches the search key 116) until a key is found in the memory 102 that matches the search key 116 or the address incrementor 176 increments through all W of the addresses 104 of the memory 102 at which a key is stored.

The prior art CAM 100 of FIG. 1 can thus require as many as W cycles to identify a stored key in the memory 102 that matches a search key 116. Another drawback is that the prior art CAM 100 requires at least two or three (depending on whether a mask and thus the mask output 108 and bit inputs 132 are included in the CAM 100) inputs 122, 132, 142 to the comparators 152 for every bit of the search key 116. The CAM 100 thus requires 2N or 3N comparator inputs 122, 132, 142, where N is the number of bits in the search key 116 as noted above. Although other prior art CAM architectures are known, such other architectures also suffer from one or both of these shortcomings or different shortcomings. Embodiments of the present invention improve one or more of such shortcomings in prior art CAMs.

SUMMARY

In some embodiments, a content addressable memory (CAM) system can include a search key input, a comparator core, and a location decoder. The search key input can be configured to receive an N-bit search key, and the comparator core can be configured to embed W N-bit keys in W comparator blocks each of which can be configured to compare its embedded key to the N-bit search key. The location decoder can be connected to outputs of the comparator blocks and configured to identify a location in the comparator core of one of the keys that matches the search key.

In some embodiments, a content addressable memory (CAM) system can include a search key input, a page module, a comparator core, and a location decoder. The search key input can be configured to receive an N-bit search key, and the page module can be configured to provide a B-bit page code for uniquely identifying P pages. The comparator core can be configured to embed W N-bit keys in W/P paged comparator blocks, and each paged comparator block can be configured to embed P of the keys each in association with a different one of the P pages and compare the search key to one of its P embedded keys that corresponds to a particular value of the page code provided by the page module. The location decoder can be connected to outputs of the paged comparator blocks and configured to identify a location in the comparator core of one of the keys that matches the search key.

In some embodiments, a process of operating a content addressable memory (CAM) can include receiving an N-bit search key at a search key input to the CAM and simultaneously comparing the search key to W N-bit keys embedded in W comparator blocks of a comparator core of the CAM by providing each bit of the search key as only a one-bit input to each of the W comparator blocks. The process can also include outputting from the CAM a location in the comparator core of one of the W keys that matches the search key.

In some embodiments, a process of operating a content addressable memory (CAM) can include receiving an N-bit search key at a search key input to the CAM and simultaneously comparing in W/P paged comparator blocks of the CAM the search key to W/P of the keys associated with a $p^{th}$ one of the pages of the paged comparator blocks. The process can also include changing the page code and repeating the comparing step and the changing step, which can be performed at least until identifying a location in the comparator core of one of the keys that matches the search key or cycling through all of the pages.

BRIEF DESCRIPTION OF THE DRAWINGS

FIG. 11 is an example of a process for finding an embedded key in the CAM system of FIG. 7 that matches a search key according to some embodiments of the invention.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," or "coupled to" are used herein, one element (e.g., a material, a layer, a substrate, etc.) can be "on," "attached to," or "coupled to" another element regardless of whether the one element is directly on, attached to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

When used with respect to mathematical formulas or expressions, the following symbols have the following meanings: + means mathematical addition; − means mathematical subtraction; * means mathematical multiplication; / means mathematical division; $x^y$ means x raised to the power y (i.e., x multiplied by itself y times); and $\log_2(x)$ means the base two logarithm of x.

As used herein, a "data input" to a memory, comparator, table, or other digital circuit is any input to the memory, comparator, table, or other digital circuit other than an input for power, ground, or a clock signal. As used herein, "embedded key" or sometimes merely "key" refers to one of a plurality of multi-bit data entities (e.g., data words) embedded (e.g., stored) in the comparator of a content addressable memory (CAM). The term "search key" refers to a multi-bit key provided as input to the CAM and which is to be compared to keys embedded in the CAM.

Figure 1:
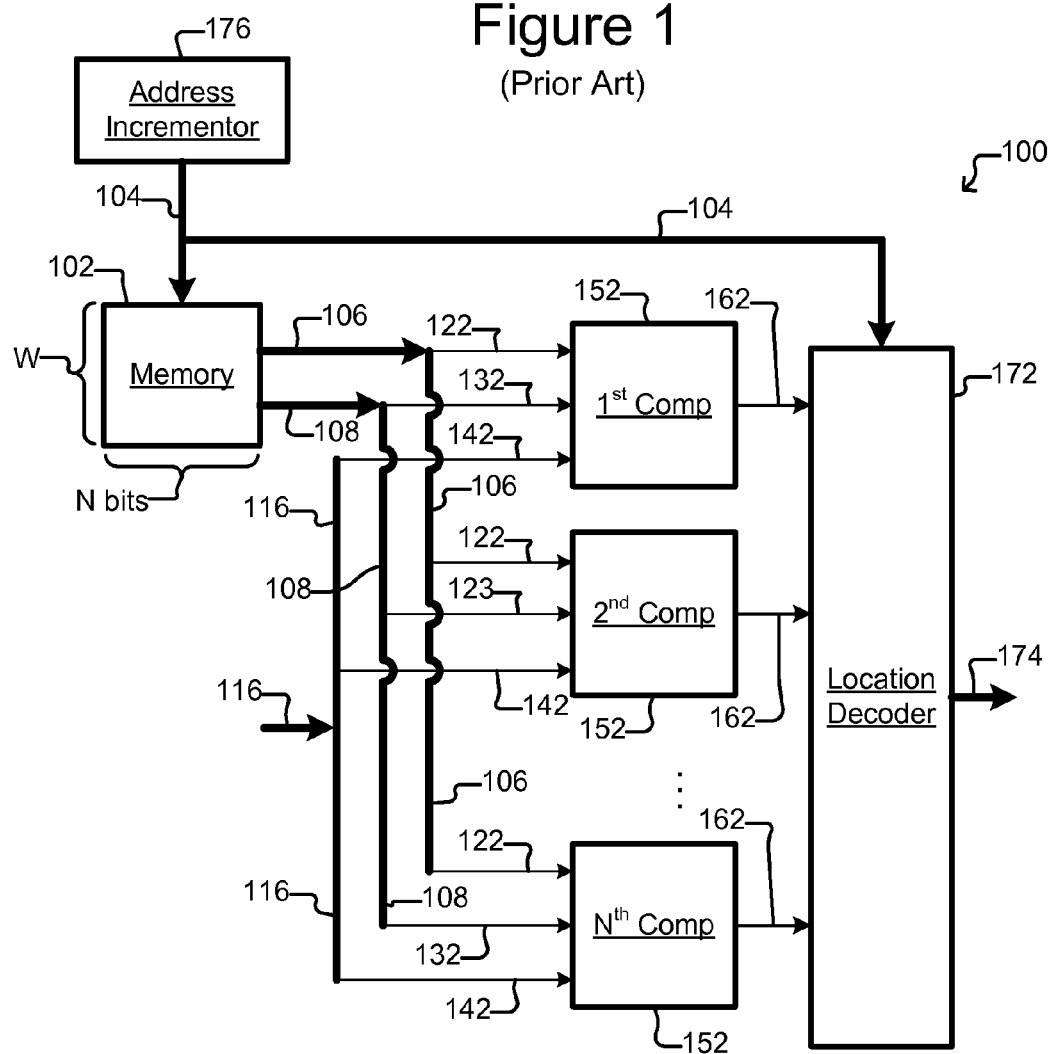
FIG. 1 illustrates an example of a prior art content addressable memory (CAM).
Figure 2:
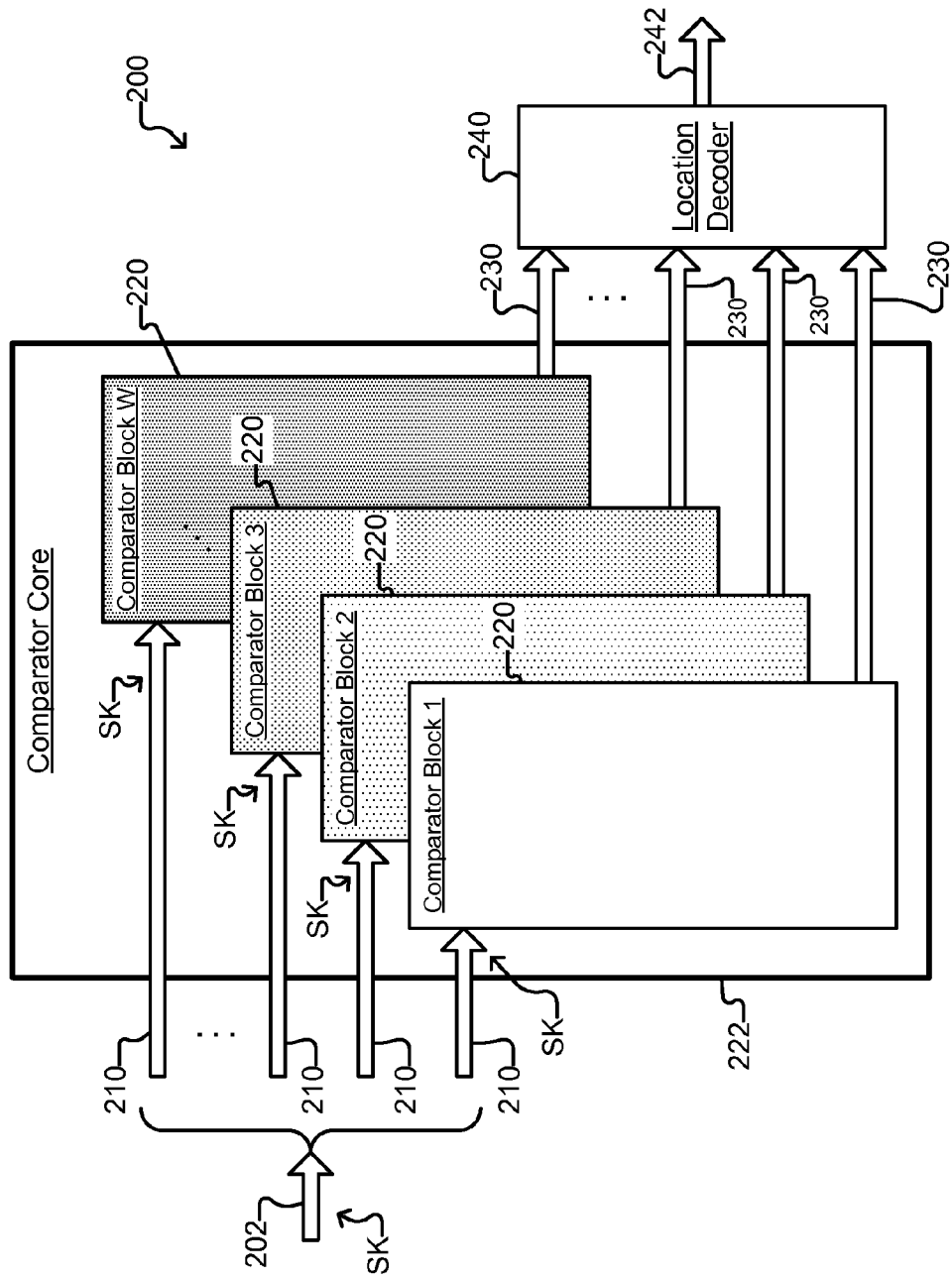
FIG. 2 is an example of a CAM system comprising a comparator core in which all of the keys of the CAM are embedded in comparator blocks according to some embodiments of the invention.

FIG. 2 illustrates an example of a CAM system 200 for embedding W N-bit keys in W different storage locations in a comparator core 222, accepting an N-bit search key SK at an input 202, and identifying a storage location in the comparator core 222 where a key that matches the search key SK is embedded. Each of W and N can be any integer that is greater than one. Moreover, W need not be equal to N. As shown, the CAM system 200 can also include a location decoder 240.

The comparator core 222 can comprise W comparator blocks 220, and the comparator core 222 can also include inputs 210 to and outputs 230 from the comparator blocks 220. There can be one input 210 for each comparator block 220, and there can thus be W inputs 210. Each input 210 can comprise N bits and can be connected to the search key input 202. Each input 210 can thus provide an N-bit search key SK at the search key input 202 to each of the comparator blocks 220. In some embodiments, the inputs 210 can be the only (or essentially the only) data inputs into the comparator core 222, which can thus have data inputs for only (or essentially only) W*N bits. Reducing or limiting the required number of data inputs can provide many possible advantages. For example, limiting the number of data inputs to the comparator core 222 can facilitate implementing the CAM system 200 (or at least the comparator core 222) in a programmable semiconductor device.

Each of the W comparator blocks 220 can embed one of the W keys and compare its embedded key with a search key SK at the input 210 to the comparator block 220. The bits of a key can be physically embedded in a comparator block 220. Alternatively, as will be seen, a particular bit pattern of a key can be effectively embedded in a comparator block 220 by programming the comparator block 220 to output 230 a match indication only when a search key having that particular bit pattern is provided at the input 210 to the comparator block 220 but otherwise output a no match indication (subject to any masking of bits as discussed below). As used herein, "embedding" (or any form of the word "embed") bits includes both of the foregoing examples.

Regardless, each comparator block 220 can thus embed a different one of the W N-bit embedded keys and compare an N-bit search key SK at its input 210 to its embedded key. A result of the comparison in each comparator block 220 can be provided through the output 230 to the location decoder 240, which can be configured to determine if one or more of the embedded keys in the comparator blocks 220 matches the search key SK. The location decoder 240 can identify at least one of the comparator blocks 220 whose embedded key matches the search key SK. The location decoder 240 can thus output 242 a location (e.g., the identity of one of the comparator blocks 220) in the comparator core 222 of at least one embedded key that matches the search key SK.

As will be seen, in some embodiments, each comparator block 220 can embed its key subject to one or more masks that mask one or more of the bits of the embedded key. A masked bit of an embedded key is a "do not care" bit that will be deemed to match a corresponding bit of a search key SK regardless of the value of the search key bit.

Figure 3:
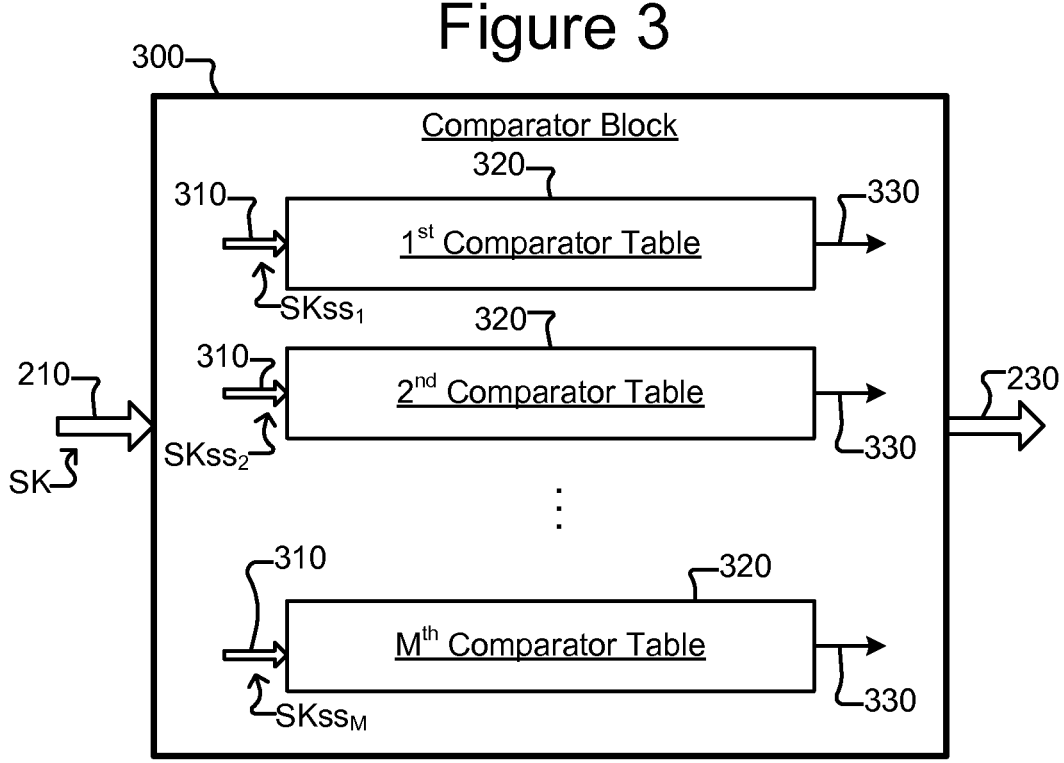
FIG. 3 shows an example configuration of a comparator block of FIG. 2 according to some embodiments of the invention.

FIG. 3 illustrates an example configuration of the comparator blocks 220 of FIG. 2. That is, each of the comparator blocks 220 in FIG. 2 can be configured like the comparator block 300 shown in FIG. 3.

As shown, the comparator block 300 can comprise M comparator tables 320, where M can be any positive integer. Each table 320 can be configured to embed a different subset of L of the N bits of the key embedded in the comparator block 300. Each table 320 can have an L-bit input 310 for a subset of L bits of the N bits of the input 210 to the comparator block 300. For example, as shown, a first subset $SKss_1$ of the bits of the search key SK at the input 210 can be provided to the input 310 of the first table 320, a second subset $SKss_2$ of the bits of the search key SK can be provided to the input 310 of the second table 320, and so on through an $M^{th}$ subset $SKss_M$ of the bits of the search key SK being provided to the input 310 of the $M^{th}$ table 320. Each table 320 can be configured to compare the subset SKss of the N bit search key SK at its input 310 to the corresponding subset of the bits of the N bit key embedded in the table 320 (subject to any masked bits as discussed above) and output 330 the result of the comparison. In some embodiments, the L-bits of the input 310 to a particular table 320 can be the only data inputs to that table 320.

Thus, in the example illustrated in FIG. 3, the N bits of the key embedded in a comparator block 300 can be divided among M tables 320 such that each table 320 embeds L bits (which is a subset of less than all N of the bits) of the embedded key but together the M tables 320 embed all of the bits of the key. The N bits of a search key SK at the input 210 to the comparator block 300 can similarly be divided among the M inputs 310 to the M tables 320, and each table 320 can compare the subset SKss of L bits of a search key SK at the input 210 to its embedded subset of L bits of the key embedded in the comparator block 300. Each table 320 can thus compare a different subset of the N bits of a search key SK at the input 210 to its corresponding L bits of the embedded key (subject to any masked bits) and output 330 a result of the comparison, which can compose the output 230 of the comparator block 300.

The number of bits L in each table 320 can be the same. For example, the number L of bits in each input 310 and table 320 can be N/M. Alternatively, L can be different for two or more of the tables 320 in the comparator block 300. Regardless, the tables 320 of FIG. 3 need not be in contiguous physical locations in the comparator core 222 of FIG. 2. For example, in some embodiments, none of the M tables in a comparator block 300 (and thus each of the comparator blocks 220 of FIG. 2) are in contiguous physical locations in the comparator core 222. As another example, at least two of the tables 320 in which are embedded consecutive subsets of the bits of a key are not in contiguous physical locations in the comparator core 222.

Regardless of whether L is the same for each table 320 or different for at least two of the tables 320 in a comparator block 300, composing a comparator block 300 of multiple comparator tables 320 each of which is smaller than the comparator block 300 can provide significant advantages. For example, the foregoing can facilitate implementing the CAM system 200 (or at least the comparator core 222) in a programmable semiconductor device (e.g., a field programmable semiconductor device), which can be more efficient and less expensive to design and manufacture than implementations of the CAM system 200 in other types of semiconductor devices such as custom designed semiconductor devices (e.g., application specific integrated circuit (ASIC) semiconductor devices). As is known, programmable semiconductor devices (e.g., field programmable semiconductor devices such as field programmable gate array (FPGA) semiconductor devices) are manufactured such that the devices can be programmed (e.g., configured) to provide specific functions after the device is manufactured. Common field programmable semiconductor devices comprise many small look up tables (LUTs), which can be programmed after being fully manufactured.

In some embodiments, each of the tables 320 in the comparator block 300, and thus all of the comparator blocks 220 in FIG. 2, can be an L-bit-input LUT of a field programmable semiconductor device that is preconfigured during manufacture to be a distinct, stand-alone L-bit-input programmable LUT such as are known in the art.

Figure 4:
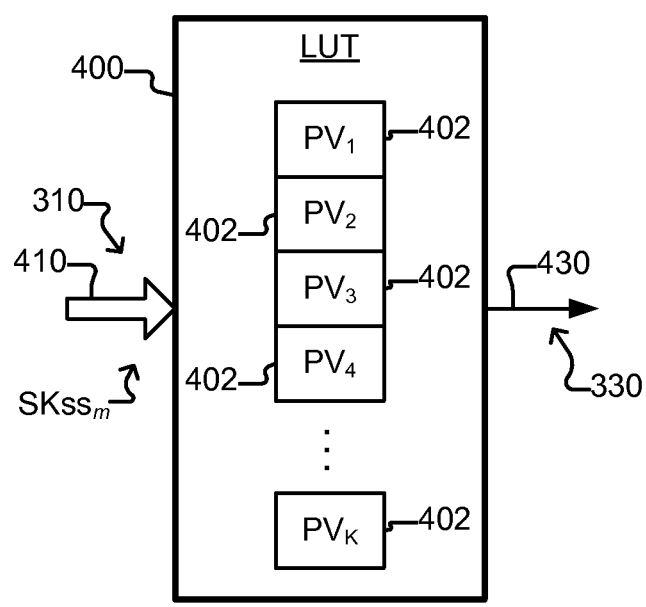
FIG. 4 illustrates an example of a comparator table of FIG. 3 configured as a look up table (LUT) of a programmable semiconductor device according to some embodiments of the invention.

FIG. 4 illustrates an example configuration of the tables 320 of FIG. 3 as LUTs of a programmable semiconductor device. That is, the LUT 400 illustrated n FIG. 4 can be an L-bit-input LUT of a programmable semiconductor device, and each of the tables 320 of FIG. 3 can be configured like the LUT 400 of FIG. 4.

As shown, the LUT 400 can comprise an L-bit input 410, K programmed values 402, and an output 430, which can be a single bit output. The input 410 can correspond to an input 310 in FIG. 3 and the output 430 can correspond to an output 330. The programmed values 402 can be, for example, one bit values, each of which can be programmed to have any desired particular value from among a set of possible values. Thus, for example, each programmed value 402 can be programmed to have a high or a low value.

The number K of programmed values 402 K can be two raised to the power of L, that is, $K=2^L$. The L bits at the input 410 can thus uniquely address each of the K programmed values 402. The LUT 400 can thus connect any one of the K different programmed values 402 to the output 430 of the LUT 400. In some embodiments, the L bits of the input 310 can be the only data inputs to the LUT 400. In some embodiments, each LUT 400 can be a digital multiplexer in which the programmed values 402 are inputs to the multiplexer and the input 410 is the selection input to the multiplexer that determines which of the programmed values 402 is connected to the output 430. Such a LUT can be programmed by setting the values of each programmed value 402, which can thus be hardwired after programming.

A particular pattern of L bits of a key embedded in the comparator block 300 of FIG. 4 can be "embedded" in the LUT 400 by programming one of the corresponding programmed values 402, subject to any masking, to have a match value and all other outputs 402 to have a no-match value. As used herein, a "match value" indicates that the pattern of L bits at the input 310 matches the pattern of L bits embedded in the LUT 400 (subject to any masking), and a "no-match value" indicates that the pattern of L bits at the input 310 does not match the pattern of L bits embedded in the LUT 400.

Table A below illustrates an example configuration of the LUT 400 of FIG. 4 in which L is equal to four. Table A and the following discussion is an example only, and L (and thus the number of bits of the input 410 in FIG. 4) can have any integer value.

Table A illustrates all sixteen possible value combinations of the four bits at the input 410 to the LUT 400 and the corresponding programmed value 402 that the LUT 400 connects to the LUT output 430. Thus, for example, when the four bits at input 410 are 0000, the programmed value 402 $PV_1$ (but no other programmed value 402) is connected to the output 430. As another example, when the four bits at the four-bit input 410 are 1011, the programmed value 402 $PV_{12}$ (but no other programmed value 402) is connected to the output 430.

TABLE A

Input 410 To LUT 400

| Bit 1 | Bit 2 | Bit 3 | Bit 4 | Output 430 |
|---|---|---|---|---|
| 0 | 0 | 0 | 0 | $PV_1$ |
| 0 | 0 | 0 | 1 | $PV_2$ |
| 0 | 0 | 1 | 0 | $PV_3$ |
| 0 | 0 | 1 | 1 | $PV_4$ |
| 0 | 1 | 0 | 0 | $PV_5$ |
| 0 | 1 | 0 | 1 | $PV_6$ |
| 0 | 1 | 1 | 0 | $PV_7$ |
| 0 | 1 | 1 | 1 | $PV_8$ |
| 1 | 0 | 0 | 0 | $PV_9$ |
| 1 | 0 | 0 | 1 | $PV_{10}$ |
| 1 | 0 | 1 | 0 | $PV_{11}$ |
| 1 | 0 | 1 | 1 | $PV_{12}$ |
| 1 | 1 | 0 | 0 | $PV_{13}$ |
| 1 | 1 | 0 | 1 | $PV_{14}$ |
| 1 | 1 | 1 | 0 | $PV_{15}$ |
| 1 | 1 | 1 | 1 | $PV_{16}$ |

A particular pattern of L bits of an N bit key can be "embedded" in the LUT 400 by setting the corresponding programmed value PV 402 to a match value and all other programmed values PV 402 to a no-match value. For example, in the example illustrated in Table A above, the 4-bit pattern 0000 can be "embedded" in the LUT 400 of FIG. 4 by setting the programmed value $PV_1$ to a match value and all of the other programmed values $PV_2$ through $PV_{16}$ to a no-match value. In the foregoing example, the LUT outputs 430 a match value only when the search key subset $SKss_m$ at the input 410 is 0000. All other patterns cause the LUT to output 430 a no-match value. As another example, the 4-bit pattern 1011 can be "embedded" in the LUT 400 of FIG. 4 by setting the programmed value $PV_{12}$ to a match value and all of the other programmed values $PV_1$ through $PV_{11}$ and $PV_{13}$ through $PV_{16}$ to a no-match value. In this example, the LUT outputs 430 a match value only when the search key subset $SKss_m$ at the input 410 is 1011; all other patterns cause the LUT to output 430 a no-match value.

A particular pattern of L bits of an N bit key can be "embedded" in the LUT 400 subject to masking of one or more bits by setting the corresponding programmed value PV 402 to a match value as discussed above, also setting all programmed values 402 that correspond to the particular pattern with opposite value(s) of the masked bit(s) to a match value, and setting all other programmed values PV 402 to a no-match value. For example, in the example illustrated in Table A above, the 4-bit pattern 0000 can be "embedded" in the LUT 400 of FIG. 4 subject to masking the third bit (corresponding to a 4-bit pattern 00m0, where m indicates the masked bit) as follows: setting the programmed values $PV_1$ and $PRV_3$ 402 to a matched value, and setting all of the other programmed values $PV_2$ and $PV_4$ through $PV_{16}$ 402 to a no-match value. In the foregoing example, the LUT outputs 430 a match value only when the search key subset $SKss_m$ at the input 410 is 0000 or 0010. All other patterns cause the LUT to output 430 a no-match value.

As another example, the 4-bit pattern 1011 can be "embedded" in the LUT 400 of FIG. 4 subject to masking the first and fourth bits (corresponding to a 4-bit pattern m01m, where m indicates masked bits) as follows: setting the programmed values $PRV_3$, $PRV_4$, $PRV_{11}$, and $PV_{12}$ 402 to a match value, and setting all of the other programmed values $PV_2$, $PV_5$ through $PV_{10}$, and $PV_{13}$ through $PV_{16}$ 402 to a no-match value. In the foregoing example, the LUT outputs 430 a match value only when the search key subset $SKss_m$ at the input 410 is 0010, 0011, 1010, or 1011. All other patterns cause the LUT to output 330 a no-match value.

Figure 5:
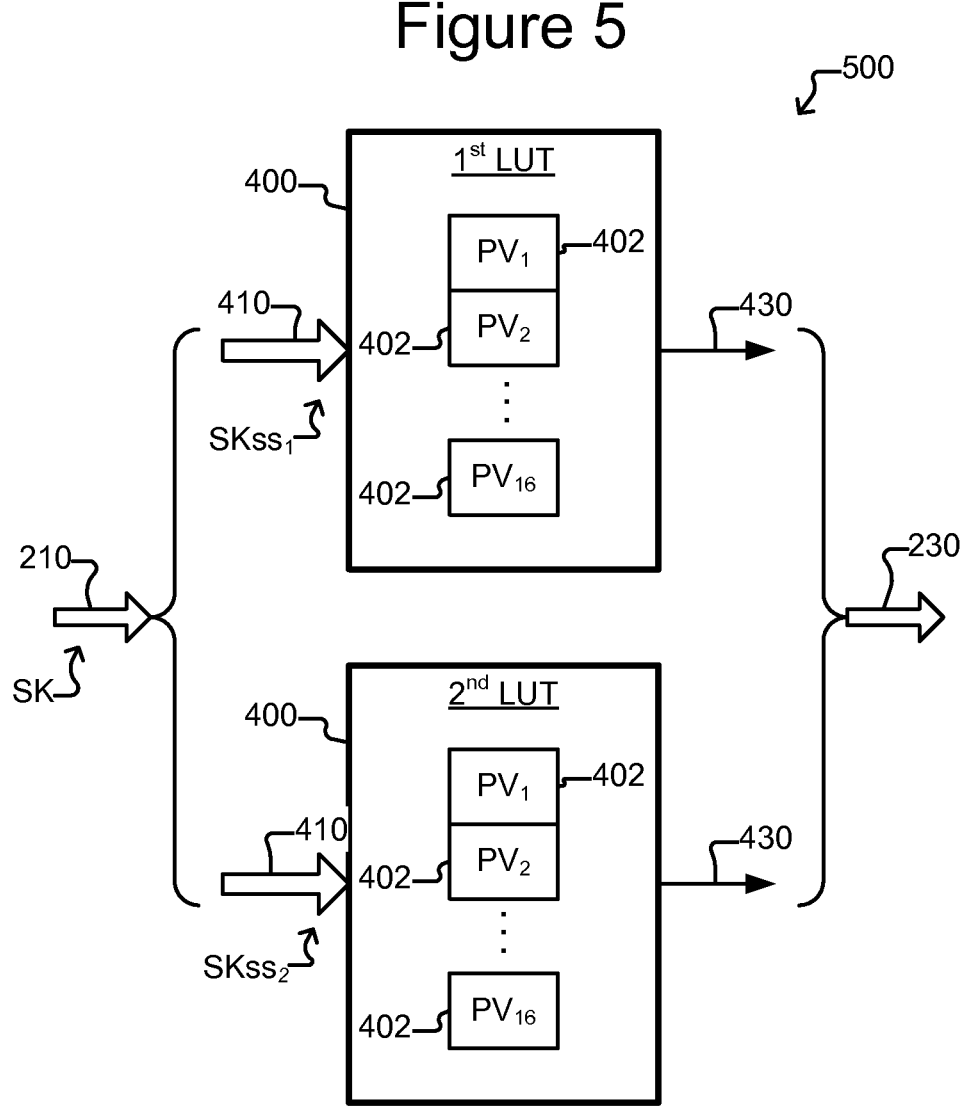
FIG. 5 is an example of one of the comparator blocks of FIG. 2 configured as a plurality of the LUTs of FIG. 4 according to some embodiments of the invention.

FIG. 5 illustrates an example of a comparator block 500 comprising two 4-bit LUTs 400. In the example shown in FIG. 5, the comparator block 500 can embed one 8-bit key and compare an 8-bit search key SK at its input 210 to the embedded key. The comparator block 500 can thus be an example configuration of any of the comparator blocks 220 in FIG. 2.

The first LUT 400 can be programmed (as discussed above) to embed the first L bits of one of the W keys in the comparator core 222 (see FIG. 2) subject to any masking, and the second LUT 400 can similarly be programmed to embed the second L bits of the key. The N bits of a search key SK provided at the input 210 to the comparator block 500 can be divided such that the first L bits are provided as a first search key subset $SKss_1$ to the input 410 of the first LUT 400 and the second L bits are provided as a second search key subset $SKss_2$ to the input 410 of the second LUT 400. The output 430 of the first LUT 400 can indicate whether the L bits of the first search key subset $SKss_1$ match the L bits of the key embedded in the first LUT 400 (subject to any masked bits), and the output 430 of the second LUT 400 can indicate whether the L bits of the second search key subset $SKss_2$ match the L bits of the key embedded in the second LUT 400 (subject to any masked bits).

Figure 6:
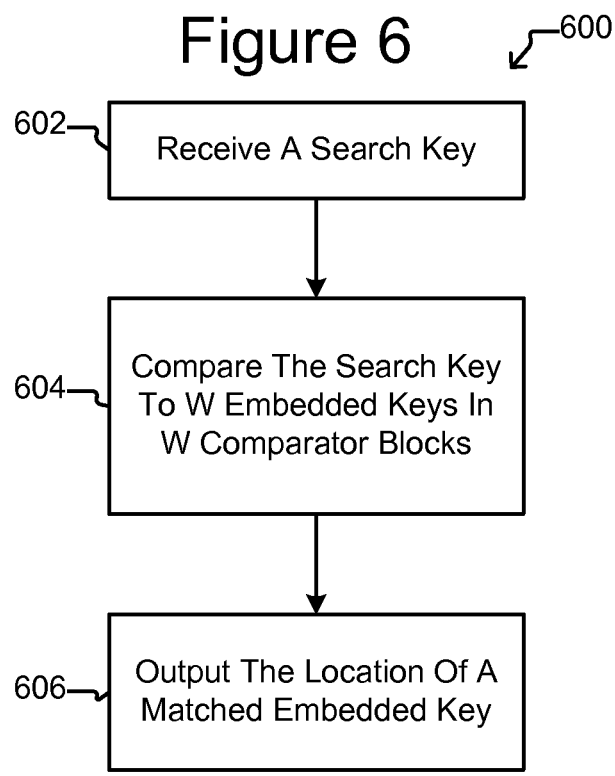
FIG. 6 is an example of a process for finding an embedded key in the CAM system of FIG. 2 that matches a search key according to some embodiments of the invention.

FIG. 6 is a process 600 illustrating an example of operation of the CAM system 200 of FIG. 2, which can be configured as illustrated in any of FIGS. 3-5 as discussed above.

As shown, at step 602, an N-bit search key SK can be received at the search key input 202. (See FIG. 2.) As noted, the search key input 202 can be connected to each of the inputs 210 of the comparator blocks 220, and the N-bit search key SK can thus be provided to each of the inputs 210 and thus each of the comparator blocks 220. Moreover, the search key SK can be provided substantially simultaneously to all of the comparator blocks 220 of the comparator core 222.

At step 604, each comparator block 220 can compare (subject to any masking) the search key SK at its input 210 to the key embedded in the comparator block 220 as discussed above. All of the W comparator blocks 220 can do so substantially simultaneously.

At step 606, the location decoder 240 can determine if the search key SK received at step 602 matches any of the keys embedded in the comparator blocks 220. If so, the location decoder 240 can output 242 the identity of the comparator block 220 in which at least one of the matching keys is embedded, which can be the location in the comparator core 222 of one or more embedded keys that match the search key SK.

The process 600 is an example only, and variations are possible. For example, there can be more or fewer steps than shown. Moreover, performance of two or more of the steps 602-606 can overlap and/or be performed substantially simultaneously. For example, performance of the process 600 can comprise providing a search key SK at the input 202, which then propagates through the inputs 210 to the comparator blocks 220. Each comparator block 220 can compare the search key SK at its input 210 to its embedded key and output the result at its output 230 without regard to the timing or performance of any of the other comparator blocks 220.

Figure 7:
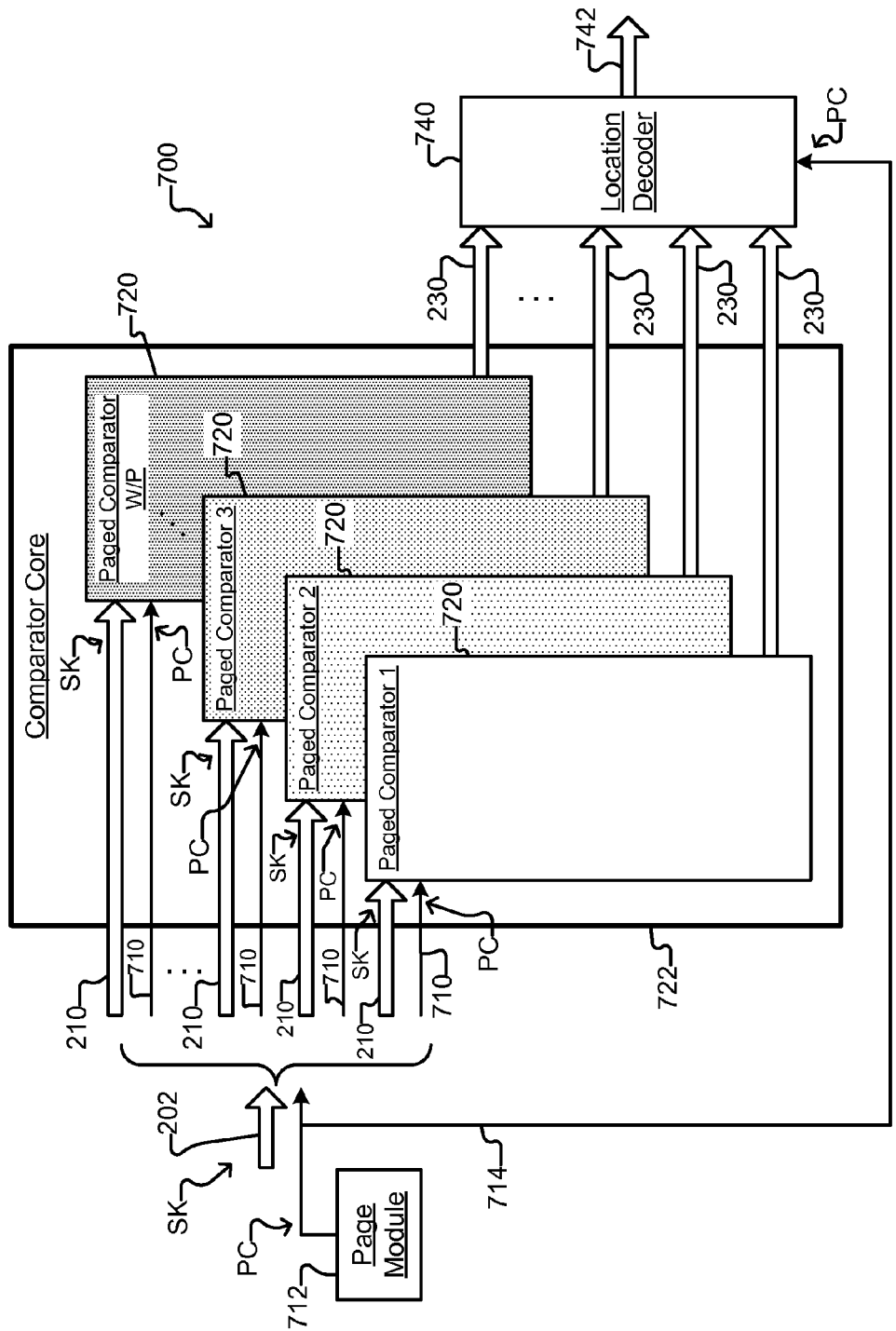
FIG. 7 is another example of a CAM system comprising a comparator core in which all of the keys of the CAM are embedded in paged comparator blocks according to some embodiments of the invention.

FIG. 7 illustrates another example of a CAM system 700, which can be similar to the CAM system 200 of FIG. 2 and, indeed, elements in FIG. 7 are the same as like number elements in FIG. 2. Like the system 200 of FIG. 2, the system 700 of FIG. 7 can embed W N-bit keys in W different storage locations in a comparator core 722, accept an N-bit search key SK at an input 202, and identify a storage location in the comparator core 722 at which one of the W keys that matches the search key SK is embedded.

In the system 700, however, the comparator core 722 can comprise paged comparator blocks 720 each of which can embed P of the W N-bit keys embedded in the comparator core 722. Each of the P keys in a paged comparator block 720 can be embedded in association with a different one of P possible pages.

As shown, each paged comparator block 720 can comprise an N-bit input 210 (which as discussed above can be connected to the search key input 202), and each paged comparator block 720 also can include at least one B-bit page input 710, where B is the number of bits required to uniquely identify each of the P different pages and thus each of the keys embedded in the paged comparator block 720. Thus, P equals two raised to the B power as follows: $P=2^B$. In some embodiments, the search key inputs 202 and page inputs 710 can be the only data inputs to the comparator core 722. Thus, the total number of data inputs to the comparator core 722 can, in some embodiments, be as follows: $((W/P)*N)+((W/P)*(B*C))$, where C is the number of page inputs 710 into each paged comparator block 720.

Each paged comparator block 720 can be configured to embed P of the W keys embedded in the comparator core 722, and each page comparator block 720 can be further configured to compare the search key SK at its search key input 210 to the one of its embedded keys identified by a B-bit page code PC at its page input 710 and provide the result of the comparison at its output 230. As noted, B is a sufficient number of bits to uniquely identify each of the P keys embedded in the paged comparator block 720. Each paged comparator block 720 can thus compare a search key SK at its input 710 sequentially to each of its embedded P keys as the page code PC at its one or more page inputs 710 is cycled to sequentially select each of those P embedded keys.

As shown, the CAM system 700 can comprise a page module 712, which can output 714 page codes PCs. The output 714 can be connected to each of the page inputs 710 into the comparator core 722 and to a location decoder 740. The location decoder 740 can receive the outputs 230 from the paged comparator blocks 720 and output an identity of a location or locations in the comparator core 722 of at least one of the embedded keys that matches the search key SK provided at the input 202. The location can be the identity of the paged comparator block 720 in which the matched key is embedded and the page associated with the matched key.

Figure 8:
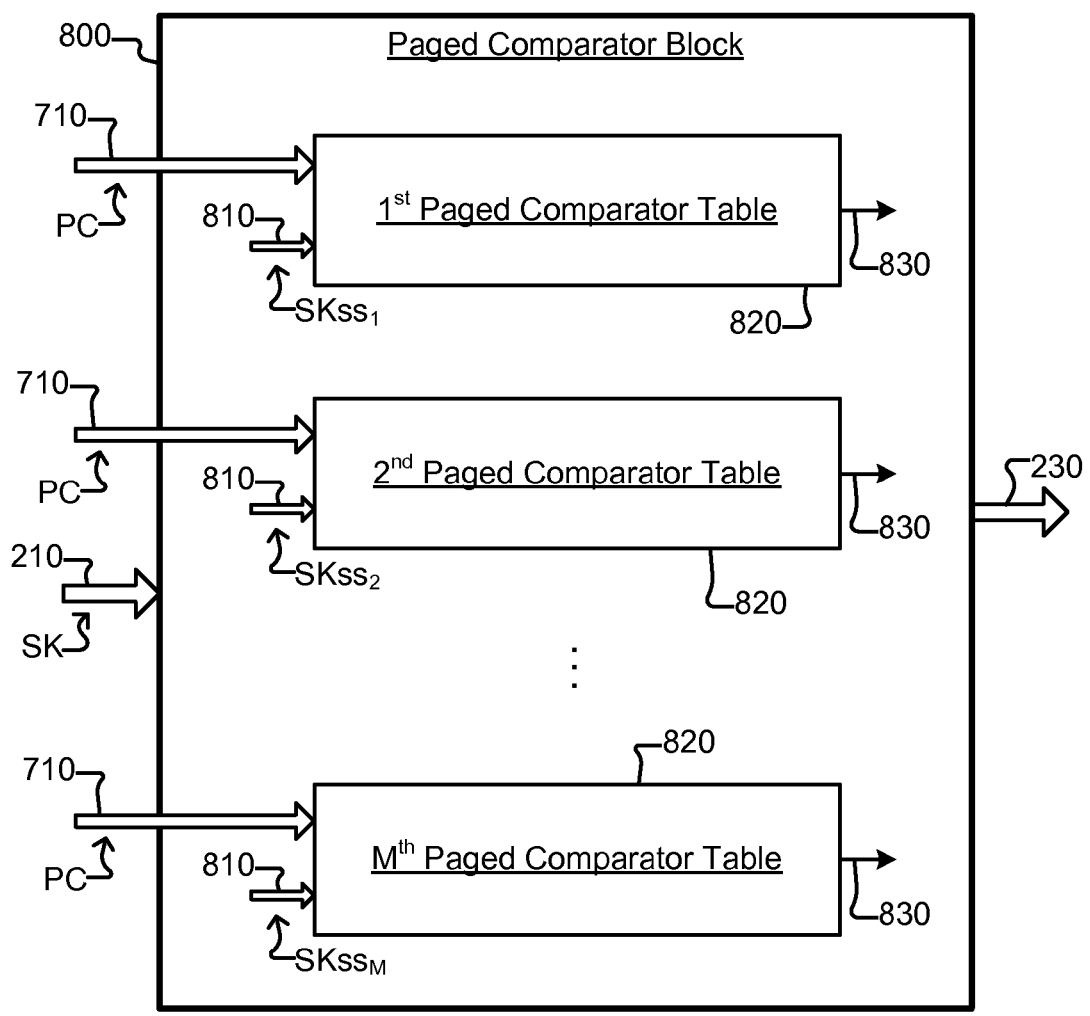
FIG. 8 illustrates an example configuration of a paged comparator block of FIG. 7 according to some embodiments of the invention.

FIG. 8 illustrates an example configuration of the paged comparator blocks 720 of FIG. 7. That is, each of the paged comparator blocks 720 in FIG. 7 can be configured like the paged comparator block 800 shown in FIG. 8.

As shown, the paged comparator block 800 can comprise M paged comparator tables 820, where M can be any positive integer. Each table 820 can be configured to embed an S-bit subset of each of the P keys embedded in the paged comparator block 800.

As also shown, each table 820 can have an S-bit search key input 810, and each table can be connected to the B-bit page input 710. There can be M B-bit page inputs 710 to the paged comparator block 800, and thus there can be M B-bit page inputs 710 to each paged comparator block 720 in FIG. 7 if the paged comparator blocks 720 are configured as illustrated in FIG. 8. As noted above, the total number of data inputs to the comparator core 722 in some embodiments of the CAM system 700 of FIG. 7 can be: $((W/P)*N)+((W/P)*(B*C))$, where C is the number of page inputs 710 into each paged comparator block 720. The value C can be the number M of paged tables 820 in a comparator block 720 configured as shown in FIG. 8.

In operation, the first S-bits of each of the P N-bit keys embedded in the paged comparator block 800 can be embedded in the first paged table 820, the second S-bits of each of the keys can be embedded in the second paged table 820, and so on with the $M^{th}$ S-bits of the embedded keys being embedded in the $M^{th}$ paged table 820. The first S-bits of the search key input 210 to the paged comparator block 800 can be connected to the search key input 810 of the first paged table 820, the second S-bits of the search key input 210 can be connected to the search key input 810 of the second paged table 820, and so on with the $M^{th}$ S-bits of the search key input 210 connected to the search key input 810 of the $M^{th}$ paged table 820. A first subset $SKss_1$ consisting of the first S-bits of an N-bit search key SK at the input 210 can thus be provided to the input 810 to the first paged table 820, a second subset $SKss_2$ consisting of the next S-bits of an N-bit search key SK at the input 210 can be provided to the input 810 to the second paged table 820, and so on with an $M^{th}$ subset $SKss_M$ consisting of the $M^{th}$ S-bits of the search key SK at the input 210 being provided to the input 810 to the $M^{th}$ paged table 820.

The page inputs 710 to the paged comparator block 800 can be provided to each of the paged tables 820, and each paged table can compare the S-bit search key subset SKss at its input 810 to the S-bit subset of the one of its keys selected by the page code PC at the page input 710. Thus, while a first page code PC is on the page inputs 710, each of the paged tables 820 compares the S-bit search key subset SKss at its input 810 to the S-bits of a first of the P keys embedded in the paged comparator block 800 and outputs the results of the comparison on its output 830. The search key SK at the input 210 has thus been compared to a first of the P keys embedded in the paged comparator block 800. The search key SK can then be compared to a second of the P keys by changing the page code PC to a second page code PC, which can cause each of the paged tables 820 to compare the same S-bit search key subset SKss at its input 810 to the S-bits of the second key and output the results of the comparison on its output 830. The page code PC can repeatedly be changed to cycle through all P of the keys embedded in the comparator block 800.

The number of bits S corresponding to each search key input 810 can be the same for all of the paged tables 820 in the paged comparator block 800. Alternatively, the number S can be different for at least two of the paged tables 820. Regardless, the tables 820 need not be in contiguous physical locations in the comparator core 722 of FIG. 7. For example, in some embodiments, none of the M tables 820 in a comparator block 800 are in contiguous physical locations in the comparator core 722. As another example, at least two of the tables 820 in which are embedded consecutive subsets of the bits of a key are not in contiguous physical locations in the comparator core 722.

Figure 9:
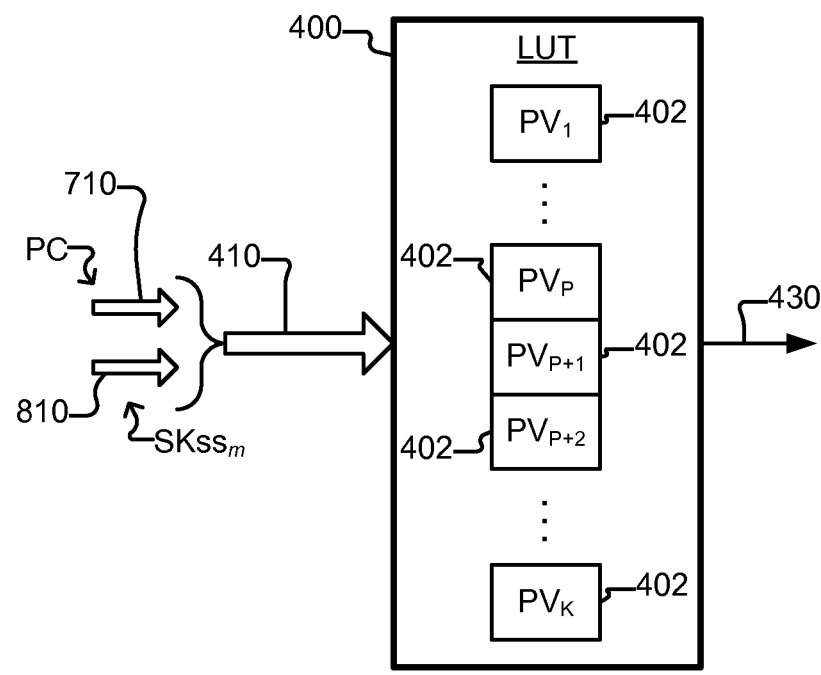
FIG. 9 illustrates an example of a paged comparator table of FIG. 8 configured as a LUT of a programmable semiconductor device according to some embodiments of the invention.

FIG. 9 illustrates an example paged configuration of the LUT 400, which can otherwise be as discussed above with respect to FIG. 4. Each of the tables 820 of FIG. 8 can comprise a LUT 400 configured as shown in FIG. 9.

As shown, the input 410 to the LUT 400 can be connected to both a page input 710 and a search key input 810 (see FIG. 8). Thus, B of the L bits of the input 410 can be connected to a page input 710 and S of the bits of the input 410 can be connected to the search key input 810. In some embodiments, L can be the sum of B and S (L=S+B). As also shown, one set of the programmed values 402 (e.g., $PV_{P+1}$ through $PV_K$ in FIG. 9) can be programmed to embed an S-bit subset the key embedded in the paged comparator block 800 (see FIG. 8) subject to masking generally as discussed above with respect to FIG. 4. Another set of the programmed values 402 (e.g., $PV_1$ through $PV_P$ in FIG. 9) can be programmed such that the S-bit subsets embedded by the programmed values 402 corresponds to (and thus is embedded in the LUT in association with) a unique one of the pages P.

Table B below illustrates an example configuration of the LUT 400 of FIG. 9 in which the input 410 to the LUT 400 is a four bit input. The number B of bits allocated to paging in the example of Table B is two, and the number S of bits allocated to embedding subsets of search key bits SKss is also two. Table B and the following discussion are examples only, and the number of bits L in the input 410 can be other than four, the value of B can be other than two, and the value of S can be other than two.

Like Table A above, Table B illustrates all sixteen possible value combinations of the four bits at the input 410 to the LUT 400 and the corresponding programmed value 402 that the LUT 400 connects to the LUT output 430. Thus, for example, when the four bits at input 410 are 0000, the programmed value 402 $PV_1$ (but no other programmed value 402) is connected to the output 430. As another example, when the four bits at the four-bit input 410 are 1011, the programmed value 402 $PV_{12}$ (but no other programmed value 402) is connected to the output 430.

TABLE B

| Page Input 710 | | Search Key SS Input 810 | | |
|---|---|---|---|---|
| $PC_{b1}$ | $PC_{b2}$ | $SKss_{b1}$ | $SKss_{b2}$ | Output 430 |
| 0 | 0 | 0 | 0 | $PV_1$ |
| 0 | 0 | 0 | 1 | $PV_2$ |
| 0 | 0 | 1 | 0 | $PV_3$ |
| 0 | 0 | 1 | 1 | $PV_4$ |
| 0 | 1 | 0 | 0 | $PV_5$ |
| 0 | 1 | 0 | 1 | $PV_6$ |
| 0 | 1 | 1 | 0 | $PV_7$ |
| 0 | 1 | 1 | 1 | $PV_8$ |
| 1 | 0 | 0 | 0 | $PV_9$ |
| 1 | 0 | 0 | 1 | $PV_{10}$ |
| 1 | 0 | 1 | 0 | $PV_{11}$ |
| 1 | 0 | 1 | 1 | $PV_{12}$ |
| 1 | 1 | 0 | 0 | $PV_{13}$ |
| 1 | 1 | 0 | 1 | $PV_{14}$ |
| 1 | 1 | 1 | 0 | $PV_{15}$ |
| 1 | 1 | 1 | 1 | $PV_{16}$ |

In the example of Table B, a LUT 400 can define four pages and embed one two bit subset of a key on each of the four pages. Configured as shown in Table B, the LUT 400 can thus embed two-bit subsets of four of the W keys embedded in the comparator core 722 (see FIG. 7), and the LUT 400 can embed each of the four two-bit subsets in association with a different one of four pages.

The four pages can correspond to the four page codes PCs 00, 01, 10, and 11, which correspond to the first four rows, the second four rows, the third four rows, and the fourth four rows respectively of the table B. A particular pattern of 2 bits of an N bit key can be "embedded" on (or in association with) a particular page in the LUT 400 by setting the programmed value PV 402 that corresponds to the 2-bit pattern of $SKss_{b1}$ and $SKss_{b2}$ bits in the four rows of the corresponding page to a match value and all other programmed values PV 402 in the four rows of the corresponding page to a no-match value. In addition, either of the two bits $SKss_{b1}$ and $SKss_{b2}$ can be masked generally as discussed above with respect to FIG. 4.

For example, in the example illustrated in Table B, the 2-bit pattern 01 can be "embedded" on the first page of the LUT 400 of FIG. 9 by setting the programmed value $PV_2$ to have a match value and each of the programmed values $PV_1$, $PV_3$, and $PV_4$ to have a no match value. As another example, the 2-bit pattern 00 can be "embedded" on the second page by setting the programmed value $PV_5$ to have a match value and each of the programmed values $PV_6$ through $PV_8$ to have a no match value. As yet another example, the 2-bit pattern 11 can be "embedded" on the third page by setting the programmed value $PV_{12}$ to have a match value and each of the programmed values $PV_9$ through $PV_{11}$ to have a no match value. As yet another example, the 2-bit pattern m1 (where "m" indicates a masked bit) can be "embedded" on the fourth page by setting the programmed values $PV_{14}$ and $PV_{16}$ to have a match value and the programmed values $PV_{13}$ and $PV_{15}$ to have a no match value.

In the foregoing examples, while the first page is selected by a page code PC of 00, the LUT 400 outputs 430 a match value only if the two bits of the search key subset SKss are 01. Similarly, while the second page is selected by a page code PC of 01, the LUT 400 outputs 430 a match value only if the two bits of the search key subset SKss are 00, and while the third page is selected by a page code PC of 10, the LUT 400 outputs 430 a match value only if the two bits of the search key subset SKss are 11. Likewise, while the fourth page is selected by a page code PC of 11, the LUT 400 outputs 430 a match value only if the two bits of the search key subset SKss are 01 or 11.

Figure 10:
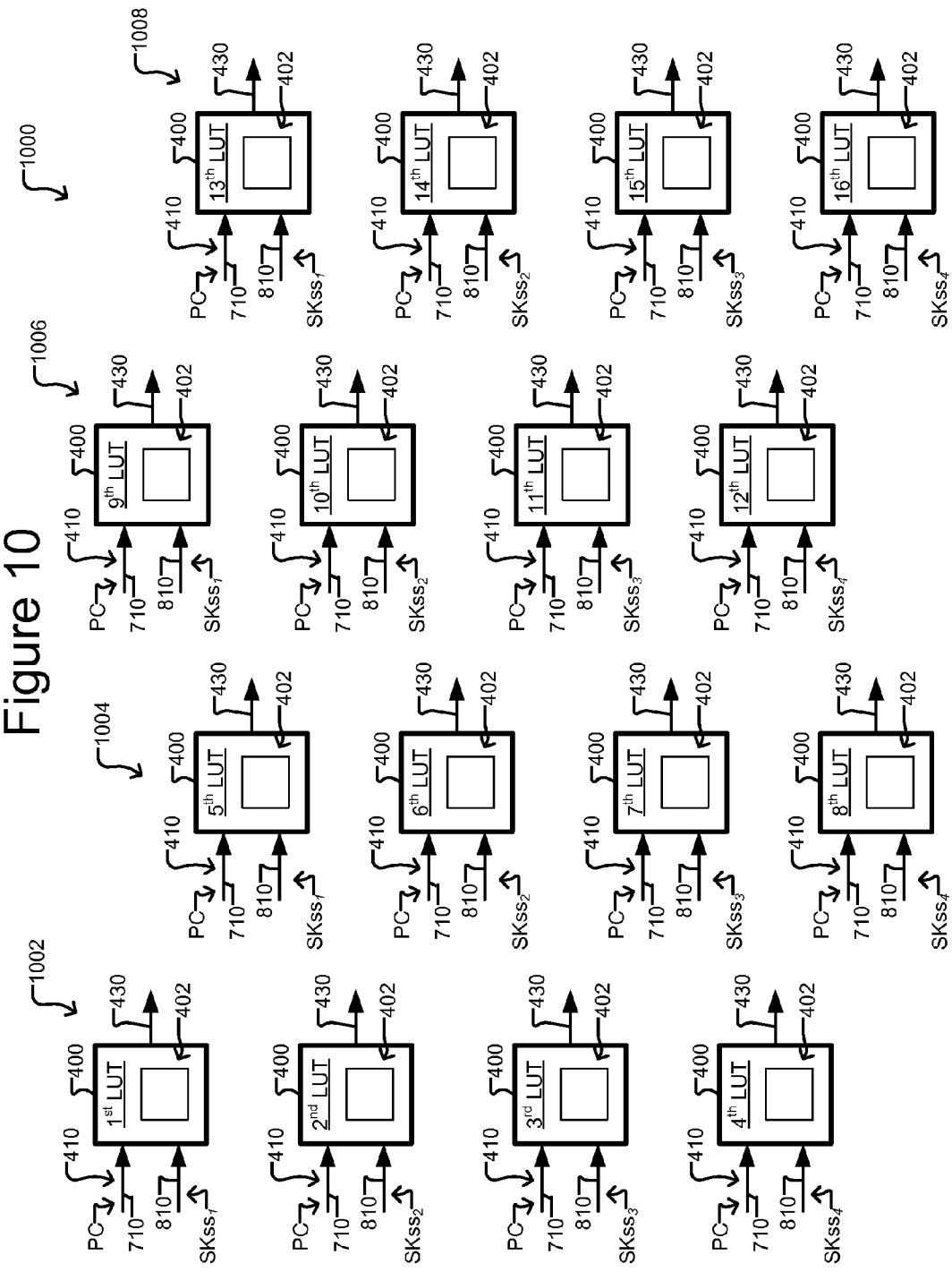
FIG. 10 is an example of one of the paged comparator blocks of FIG. 7 configured as a plurality of the LUTs of FIG. 9 according to some embodiments of the invention.

FIG. 10 illustrates an example of a paged comparator block 1000 comprising sixteen 4-bit LUTs 400 each configured as illustrated in FIG. 9. As will be seen, the paged comparator block 1000 illustrated in FIG. 10 can embed four 8-bit keys 1002, 1004, 1006, 1008 on four different pages. In the example of FIG. 10, P is four, N is eight, M is two, B is two, and L is four. (See FIGS. 7 and 8.) Of course, those numbers can be different in other examples and embodiments.

Each of the first, second, third, and fourth LUTs 400 can embed two bits of a first 8-bit key 1002, and each can be configured to generate a match at its output 430 only if the page code PC at its page input 710 corresponds to a first page and the two-bit subset $SKss_1$, $SKss_2$, $SKss_3$, or $SKss_4$ of the search key SK at its search key input 710 matches (subject to any masking as discussed above) the embedded two bits of the key 1002. Otherwise, each of the first, second, third, and fourth LUTs 400 generates a no match at its output 430.

Similarly, each of the fifth, sixth, seventh, and eighth LUTs 400 can embed two bits of a second 8-bit key 1004, and each can be configured to generate a match at its output 430 only if the page code PC at its page input 710 corresponds to a second page and the two-bit subset $SKss_1$, $SKss_2$, $SKss_3$, or $SKss_4$ of the search key SK at its search key input 710 matches (subject to any masking) the embedded two bits of the second key 1004. Otherwise, each of the fifth, sixth, seventh, and eighth LUTs 400 generates a no match at its output 430.

Likewise, each of the ninth, tenth, eleventh, and twelfth LUTs 400 can embed two bits of a third 8-bit key 1006, and each can be configured to generate a match at its output 430 only if the page code PC at its page input 710 corresponds to a third page and the two-bit subset $SKss_1$, $SKss_2$, $SKss_3$, or $SKss_4$ of the search key SK at its search key input 710 matches (subject to any masking) the embedded two bits of the third key 1006. Otherwise, each of the ninth, tenth, eleventh, and twelfth LUTs 400 generates a no match at its output 430.

Similarly, each of the thirteenth, fourteenth, fifteenth, and sixteenth LUTs 400 can embed two bits of a fourth 8-bit key 1008, and each can be configured to generate a match at its output 430 only if the page code PC at its page input 710 corresponds to a fourth page and the two-bit subset $SKss_1$, $SKss_2$, $SKss_3$, or $SKss_4$ of the search key SK at its search key input 710 matches (subject to any masking) the embedded two bits of the fourth key 1006. Otherwise, each of the thirteenth, fourteenth, fifteenth, and sixteenth LUTs 400 generates a no match at its output 430.

FIG. 11 is a process 1100 illustrating an example of operation of the CAM system 700 of FIG. 7, which can be configured as illustrated in any of FIGS. 8-10 as discussed above.

As shown at step 1102, an N-bit search key SK can be received at the input 202 of the CAM system 700 of FIG. 7. As noted, the search key input 202 can be connected to each of the inputs 210 to the paged comparator blocks 720, and the N-bit search key SK can thus be provided to each of the inputs 210 and thus each of the paged comparator blocks 720 in FIG. 7. Moreover, the search key SK can be provided substantially simultaneously to all W/P of the paged comparator blocks 720 in the comparator core 722.

At step 1104, each paged comparator block 720 can compare the search key SK at its input 210 to the one of its embedded keys associated with the currently selected page (e.g., the $p^{th}$ page), which corresponds to the current value of the page code PC output by the page module 712. The current value of the page code PC at the first performance of step 1104 can be any of the possible values of the page code PC. For example, the current value of the page code PC can be the value of the last value of the page code PC following a previous key search, an initialized value, or the like. Regardless, as there are W/P paged blocks 720 and one page is selected in each paged block 720, the search key SK can be compared to W/P of the keys in the comparator core 722 substantially simultaneously.

At step 1106, the location decoder 740 can determine if the search key SK received at step 1102 matches any of the keys embedded in the W/P selected comparator blocks 720. If so, at step 1108, the location decoder 740 can output 742 the identity of the paged comparator block 720 and the associated page of a matching one of the embedded keys, which can be the location in the comparator core 722 of a key that matches the search key SK. Otherwise, the page module 712 can change (e.g., increment or step) the page code PC at step 1110 and provide the changed page code PC to the page inputs 710 and the location decoder 740 as discussed above. The process 1100 can then repeat step 1104, step 1106, and step 1108 or 1110 with the changed page code PC generally as discussed above.

The process 1100 can continue changing the page code at step 1110 and repeating step 1104, step 1106, and step 1108 or 1110 until a match is found at step 1106 or the page code PC has been changed at step 1110 to select all P page values. Although the process 1100 is illustrated in FIG. 11 as terminating after step 1108 upon finding a match condition at step 1106, the process 1100 can instead branch from step 1108 to step 1110 and thus continue searching for additional matches of the search key SK among the keys embedded in the comparator core 722.

The process 1100 is an example only, and variations are possible. For example, there can be more or fewer steps than shown. Moreover, performance of two or more of the steps 1102-1110 can overlap and/or be performed substantially simultaneously. For example, performance of the process 1100 can comprise providing a search key SK at the input 202, which then propagates through the inputs 210 to the paged comparator blocks 720. Each paged comparator block 720 can compare the search key SK at its input 210 to its embedded key associated with the page code PC at its page input 710 and output the result at its output 230 without regard to the timing or performance of any of the other paged comparator blocks 720.

Although specific embodiments and applications of the invention have been described in this specification, these embodiments and applications are exemplary only, and many variations are possible.

I claim:

1. A content addressable memory (CAM) system comprising:
    a search key input configured to receive an N-bit search key;
    a comparator core configured to embed W N-bit embedded keys in W comparator blocks each configured to compare its embedded key to the N-bit search key, wherein each comparator block comprises M look up tables (LUTs) each programmed to embed an L-bit subset of the embedded key in the comparator block and having an L-bit input for an L-bit subset of the search key where M is greater than one and L is less than N, and wherein each comparator block outputs a match indication only if each L-bit subset of the search key matches each corresponding L-bit subset of the embedded key in the comparator block subject to any masked bits; and
    a location decoder connected to outputs of the comparator blocks and configured to identify a location in the comparator core of one of the embedded keys that matches the search key.

2. The CAM system of claim 1, wherein programming embeds the embedded keys in the comparator blocks.

3. The CAM system of claim 1, wherein data inputs to each comparator block consist essentially only of N bits for the search key.

4. The CAM system of claim 1, wherein data inputs to each LUT consist solely of said L bits.

5. The CAM system of claim 1, wherein each LUT is an independently programmable logic block of a programmable semiconductor device.

6. The CAM system of claim 1, wherein the comparator core is configured to compare the search key to all of the W embedded keys substantially simultaneously.

7. The CAM system of claim 1, wherein data inputs to the comparator core consist essentially only of W*N bits for W copies of the search key.

8. The CAM system of claim 1, wherein the identified location in the comparator core of the matched embedded key comprises an identification of the comparator block in which the matched embedded key is embedded.

9. A content addressable memory (CAM) system comprising:
    a search key input configured to receive an N-bit search key;
    a page module configured to provide a B-bit page code for uniquely identifying P pages;

a comparator core configured to embed W N-bit embedded keys in W/P paged comparator blocks, wherein each paged comparator block comprises P sets of M look up tables (LUTs) with each of the P sets embedding one of the embedded keys such that each paged comparator block embeds P embedded keys, and wherein each of the M LUTs embeds an S-bit subset of the corresponding embedded key, each of the P sets also being associated with a different B-bit page code;

wherein each paged comparator block is configured to compare the search key to one of its P embedded keys that corresponds to a particular value of the page code provided by the page module, and wherein each paged comparator block comprises programmable logic programmed to output a match indication only if:

the search key matches one of the P embedded keys embedded in the paged comparator block subject to any masked bits, and the particular value of the page code matches the page code associated with the set of LUTs where the matched key is embedded; and a location decoder connected to outputs of the paged comparator blocks and configured to identify a location in the comparator core of the matched key.

10. The CAM system of claim 9, wherein:

data inputs to each paged comparator block consist essentially only of N bits for the search key and M*B bits for M copies of the page code, and M is an integer that is greater than or equal to one.

11. The CAM system of claim 10, wherein each LUT has an L-bit input for an S-bit subset of the search key and the B-bit page code received at the page input, M is greater than one, S is less than N, and

S+B=L.

12. The CAM system of claim 11, wherein data inputs to each LUT consist solely of the L bits.

13. The CAM system of claim 11, wherein each LUT is an independently programmable logic block of a programmable semiconductor device.

14. The CAM system of claim 11, wherein data inputs to the comparator core consist essentially only of (W/P)*N bits for W/P copies of the search key and (M*B)*(W/P) bits for M*(W/P) copies of the page code.

15. The CAM system of claim 9, wherein the comparator core is configured to compare the search key to W/P of the embedded keys substantially simultaneously.

16. The CAM system of claim 15, wherein the W/P of the embedded keys comprise one of the embedded keys embedded in each of the paged comparator blocks.

17. The CAM system of claim 9, wherein the identified location in the comparator core of the matched key comprises an identification of the paged comparator block in which the matched key is embedded and the associated page code.

18. A process of operating a content addressable memory (CAM), comprising:

receiving an N-bit search key at a search key input to the CAM;

simultaneously comparing the search key to W N-bit embedded keys embedded in W comparator blocks of a comparator core of the CAM, wherein each comparator block comprises M look up tables (LUTs) each programmed to embed an L-bit subset of the embedded key in the comparator block and having an L-bit input for an L-bit subset of the search key where M is greater than one and L is less than N, and wherein each comparator block outputs a match indication only if each L-bit subset of the search key matches each corresponding L-bit subset of the embedded key in the comparator block subject to any masked bits, and outputting from the CAM a location in the comparator core of one of the W embedded keys that matches the search key.

19. The process of claim 18, wherein providing a subset of the search key to each LUT comprises providing each bit of the subset of the search key as a single bit input to the LUT.

20. A process of operating a content addressable memory (CAM) comprising a comparator core in which are embedded W N-bit embedded keys, wherein the comparator core comprises W/P paged comparator blocks each embedding P of the embedded keys, wherein each paged comparator block comprises P sets of M look up tables (LUTs) with each of the P sets embedding one of the embedded keys, and wherein each of the M LUTs embeds an S-bit subset of the corresponding embedded key, each of the P sets also being associated with a different one of P pages, the processing comprising:

receiving an N-bit search key at a search key input to the CAM;

simultaneously comparing in the W/P paged comparator blocks the search key to W/P of the embedded keys associated with a $p^{th}$ one of the pages of the paged comparator blocks; and at least until identifying a location in the comparator core of one of the embedded keys that matches the search key or cycling through all of the pages, changing the page code and repeating the comparing step and the changing step.

21. The process of claim 20 further comprising outputting from the CAM a location in the comparator core of one of the W embedded keys that matches the search key.

22. The process of claim 20, wherein the comparing further comprises:

providing a different S-bit subset of the search key to each LUT of the paged comparator block, providing a B-bit page code to each LUT of the paged comparator block, and each LUT outputting a match indication only if its subset of the search key matches its embedded subset of the embedded key and associated page.

23. The process of claim 22, wherein:

each LUT consists solely of an L-bit input,

S is less than N,

B is sufficient to uniquely define the P pages, and

L is greater than or equal to S+B.

24. The process of claim 23, wherein the comparing further comprises providing to each LUT only the S-bit subset of the search key and the B-bit page code.

* * * * *